United States Patent [19]

Trebillon

[11] Patent Number: 4,492,682
[45] Date of Patent: Jan. 8, 1985

[54] PREPARATION OF ULTRAPURE BOEHMITES AND/OR PSEUDO-BOEHMITES

[75] Inventor: Emile Trebillon, Neuilly/sur/Seine, France

[73] Assignee: Rhone-Poulenc Specialites Chimiques, Courbevoie, France

[21] Appl. No.: 460,926

[22] Filed: Jan. 25, 1983

[30] Foreign Application Priority Data

Jan. 29, 1982 [FR] France ................ 82 01391

[51] Int. Cl.³ .............................................. C01F 7/02
[52] U.S. Cl. ................................ 423/626; 423/625; 423/630; 423/631
[58] Field of Search ................ 423/625, 626, 630, 631

[56] References Cited

U.S. PATENT DOCUMENTS

| | | | |
|---|---|---|---|
| 2,898,307 | 8/1959 | Keith | 423/628 |
| 3,268,295 | 8/1966 | Armbrust et al. | 423/625 |
| 3,839,536 | 10/1974 | Sato et al. | 423/132 |
| 4,344,928 | 8/1982 | Derpin et al. | 423/625 |

FOREIGN PATENT DOCUMENTS 56-45823  4/1981  Japan .................... 423/625

*Primary Examiner*—Herbert T. Carter
*Attorney, Agent, or Firm*—Burns, Doane, Swecker & Mathis

[57] ABSTRACT

Ultrapure and homogeneous boehmites and/or pseudo-boehmites, suitable, whether before or after drying and/or calcination, as, e.g., fillers, binders, thickeners, dispersing agents, and the like, are prepared (i) by admixing an amorphous aluminum hydroxycarbonate, itself advantageously prepared by carbonating an alkali metal aluminate with carbon dioxide and then filtering and washing the precipitate which results, with a solution of an acid, a base, a salt, or mixture thereof, with the pH of the resulting reaction medium being maintained at a value of less than 11, (ii) next heating such reaction medium at a temperature of less than 90° C. for a period of at least 5 minutes, and (iii) then heating the reaction medium resulting from the step (ii) at a temperature ranging from 90° C. to 250° C.

20 Claims, 5 Drawing Figures

PREPARATION OF ULTRAPURE BOEHMITES AND/OR PSEUDO-BOEHMITES

BACKGROUND OF THE INVENTION

1. Field of the Invention

The present invention relates to the preparation of ultrapure boehmites and pseudo-boehmites from amorphous aluminum hydroxycarbonate, to the boehmites thus prepared and to the various uses or applications thereof.

2. Description of the Prior Art

Aluminas can be in a variety of crystalline forms, depending upon the particular process employed for their preparation. The industrial applications of alumina demand, in certain cases, that it should have the maximum active surface area and the smallest possible crystallite size.

Aluminas having a high specific surface area frequently consist of alumina monohydrates. Same are typically obtained from aluminum salts (nitrate, chlorides), such as described, for example, in French Pat. No. 1,261,182. The products obtained are generally used as hardeners, coating agents, starting materials for catalysts, catalyst supports and desiccants.

One of the principal disadvantages of the aforesaid process is the need to use, as the source of alumina, materials which are difficult and uneconomic to prepare and which give rise to ecologically hazardous effluents, such as aluminum chloride or nitrate solutions obtained from aluminum metal.

Furthermore, the corrosive nature of the anions used frequently results in contamination of the product alumina by release of metal values forming part of the apparatus of preparation.

The anion which is most easily displaced from alumina and which presents the least toxicity hazard is the carbonate ion, which is thermally unstable. It was therefore envisaged to prepare aluminum hydroxycarbonate by carbonating alkali metal aluminates with carbon dioxide or alkali metal bicarbonate. The carbonate is then displaced in order to provide the alumina.

Thus, it is known from U.S. Pat. No. 3,268,295 to produce an alumina hydrate having the crystal structure of pseudo-boehmite and containing from 1.4 to 1.6 mols of water per molecule of alumina. This product has a greater specific surface area than that of activated alumina. It is prepared by carbonating sodium aluminate to give a precipitate of an amorphous alumina gel, washing this precipitate and then thermally decomposing same at a temperature above 100° C. to provide a crystalline alumina hydrate. In contrast to fibrillar boehmite, the product obtained is not dispersible in water.

It too is known, from European patent application No. 15,196, assigned to the assignee hereof, to prepare alumina partially in the form of boehmite. As the starting material, this process uses an active alumina of poorly crystalline and/or amorphous structure, obtained by the rapid dehydration of aluminum hydroxides. It proves relatively difficult to obtain very pure products by this process.

Cf. U.S. Pat. Nos. 2,898,307 and 3,839,536; French Pat. Nos. 969,488 and 2,449,650; British Patent Specification No. 1,143,787; *Chemical Abstracts*, 84, No. 6, page 3, item 35867z (Feb. 9, 1976) and *Chemical Abstracts*, 83, No. 8, page 276, item 62890n (Aug. 25, 1979).

SUMMARY OF THE INVENTION

Accordingly, a major object of the present invention is the provision of an improved process for the preparation of ultrapure and homogeneous boehmites and pseudo-boehmites from aluminum hydroxycarbonates characterized by degrees of conversion on the order of 100%.

Briefly, the present invention features a process for the preparation of ultrapure boehmites and pseudo-boehmites by reacting an alkali metal aluminate with carbon dioxide to form a precipitate of amorphous aluminum hydroxycarbonate, filtering off the precipitate thus obtained and then washing same, such process comprising:

(i) in a first step, the washed precipitate of amorphous aluminum hydroxycarbonate is mixed with a solution of an acid, a base, a salt or a mixture thereof, such mixing being carried out by pouring the solution onto the hydroxycarbonate, with the pH of the medium thus formed being less than 11;

(ii) in a second step, the reaction medium formed as above is heated at a temperature below 90° C. for a period of at least 5 minutes; and (iii) in a third step, the medium resulting from the second step is heated at a temperature ranging from 90° C. to 250° C.

DETAILED DESCRIPTION OF THE INVENTION

Figure 1:
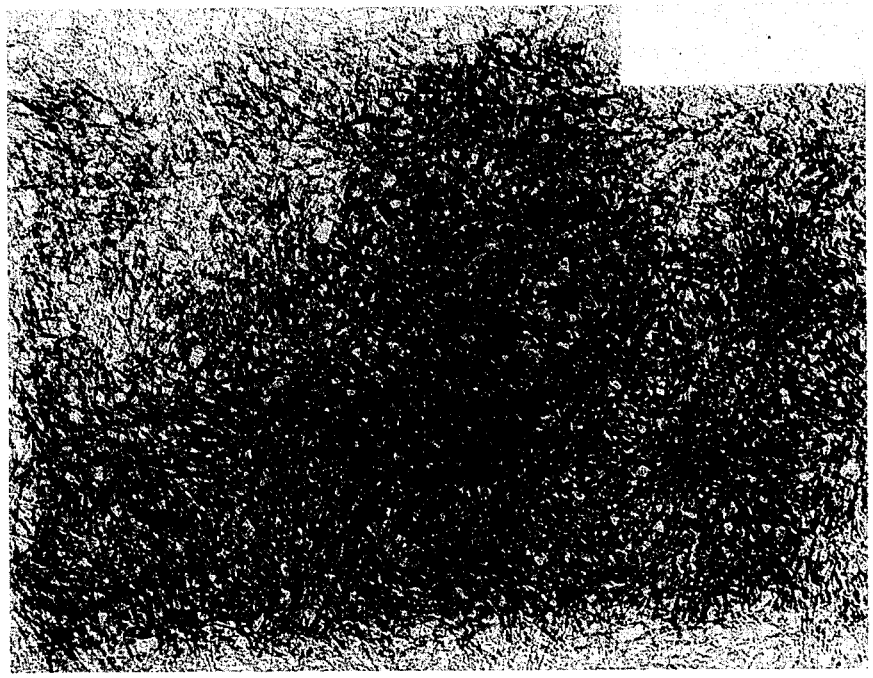
FIG. 1 is a transmission electron photomicrograph of an alumina suspension prepared according to the invention.

More particularly according to the present invention, in the subject process the aluminum hydroxycarbonate is advantageously prepared by reacting an alkali metal aluminate with pure carbon dioxide or carbon dioxide diluted with a gas such as nitrogen or oxygen.

The concentration of the initial aqueous solution of alkali metal aluminate advantageously ranges from 20 to 200 g/liter and preferably ranges from 40 to 150 g/liter, expressed as alumina, $Al_2O_3$, and the partial pressure of the carbon dioxide is advantageously maintained at from 0.3 to 10 bars and preferably at from 0.5 to 3 bars. The reaction can be carried out according to any known technique for the precipitation of a solid by means of a gas/liquid reaction, either by bubbling the gas into a solution of aluminate, or by gradually introducing the solution of aluminate into an aqueous medium into which the gas is injected.

The reaction temperature and reaction time play a very important role in the formation of the final product; it is very particularly advantageous to fix the temperature at from 0° to 60° C. and preferably at from 20° to 50° C., the reaction time being less than 30 minutes.

The final pH of the reaction medium must range from 7 to 11.5 and preferably from 9 to 11.

The aluminum hydroxycarbonate obtained is in the form of a suspension of an amorphous compound which contains virtually none of the crystalline organization of aluminum compounds such as hydrargillite, bayerite, nordstrandite, scarbroite or dawsonite. In terms of the invention, "amorphous aluminum hydroxycarbonate" is to be understood as connoting a compound whose X-ray analysis indicates no diffraction line characteristic of a crystalline phase of any type.

The reaction conditions described above make it possible to avoid the formation of such crystalline products.

The suspension of amorphous aluminum hydroxycarbonate obtained is filtered, by techniques well known to those skilled in the art, at a temperature ranging from 0° to 60° C. and preferably ranging from 20° to 50° C.

The precipitate obtained, which contains a high proportion of alkali metal ions, must be carefully washed with water, by washing techniques also well known to those skilled in the art, until the wash waters have a resistivity of more than $10^5$ Ω.cm, measured at 20° C.

The present invention specifically features in a first step, mixing the carefully washed precipitate of amorphous aluminum hydroxycarbonate, obtained as above, with a solution of an acid, a base, a salt or a mixture thereof, such mixing being carried out by pouring the solution onto the hydroxycarbonate, and with the pH of the medium thus formed being less than 11, measured at 20° C.

The acids utilized can be strong acids or weak acids, which are soluble in water; same can be used in admixture. They can be mineral or organic acids. Among the organic acids, water-soluble, optionally halogenated monocarboxylic and dicarboxylic acids are suitable for the purposes of the invention. The following are representative: nitric acid, perchloric acid, sulfuric acid, hydrochloric acid, hydriodic acid, hydrobromic acid, formic, acetic, propanoic, butanoic, oxalic, maleic, succinic, glutaric and adipic acids, and chloroacetic and bromoacetic acids. Admixtures thereof can also be used.

The bases utilized can be water-soluble weak bases such as ammonia, amines such as methylamine, ethylamine or propylamine, quaternary ammonium hydroxides, and compounds or compositions which in situ decompose under the reaction conditions to give a base, such as, for example, hexamethylenetetramine or urea. Admixtures of bases can also be used.

Among the salts which can be used according to the invention, representative are, in particular, the water-soluble salts derived from ammonia and from amines, and those comprising the aluminum cation and comprising the nitrate, chloride, formate, acetate or oxalate anion. Admixture of salts too can be used.

According to the invention, mixtures of the various solutions of acid, base or salts can also be used.

According to one preferred embodiment of the invention, the first step is advantageously carried out when the concentration of aluminum compound in the mixture obtained ranges from 20 to 400 g/liter and preferably when it ranges from 40 to 200 g/liter, expressed as $Al_2O_3$.

Furthermore, the mixture must be such that the molar ratio of the sum of the anions and cations present (excluding $H^+$ and $OH^-$) to the equivalent of the aluminum compound present, expressed as $Al_2O_3$, preferably ranges from 0.01 to 2 and more preferably from 0.03 to 0.9.

In the second step according to the invention, the reaction medium resulting from the first step is heated at a temperature below 90° C. for a period of at least 5 minutes.

This second step heat treatment is carried out at a temperature not exceeding 90° C., and preferably ranges from 50° to 85° C., for a period of time preferably ranging from 5 minutes to 5 hours.

Without wishing to be bound to any particular theory, it can be considered that the presence of the anion introduced via the acid or the salt, and the treatment temperature (below 90° C.), permit a partial exchange between the anion introduced and the carbonate anion which was present in the hydroxycarbonate. In the case where a base is used, this contributes towards fixing the carbonate ion of the hydroxycarbonate. This exchange makes it possible to remove a portion of the carbon dioxide, which can optionally be recycled into the initial operation of carbonation of the alkali metal aluminate.

The third step according to the invention comprises heating the reaction medium resulting from the second step at a temperature ranging from 90° C. to 250° C., and preferably ranging from 100° to 160° C., for 10 minutes to 30 hours and preferably for from 30 minutes to 10 hours. Under these conditions, a crystallization process results which influences the medium towards the formation of a boehmite or a pseudo-boehmite.

According to the reaction conditions, namely, the molar ratio of the sum of the anions and cations introduced, except for $H^+$ and $OH^-$, to the equivalent of the aluminum hydroxycarbonate, expressed as $Al_2O_3$, the pH, the reaction temperature and the reaction time, the products obtained are varied and possess a greater or lesser degree of crystalline organization.

The degree of crystalline organization increases from pseudo-boehmite to boehmite when the molar ratio of anion/$Al_2O_3$ decreases and when the temperature and the heating time increase.

As the degree of organization increases, the X-ray diffraction lines become more clearly defined, while the morphology evolves through the characteristic states of films, fibrils, rods and platelets, and while the particle size increases from a few tens of angstroms to a few thousand angstroms.

According to the process of the invention, it is possible to obtain virtually quantitative degrees of conversion of the aluminum hydroxycarbonate to boehmite and/or pseudoboehmite.

The subject boehmites and pseudo-boehmites can be characterized by X-ray diffraction (hereafter, the crystallographic reference axes are those given by B. C. Lippens, thesis, Delft, 1961) and by electron microscopy.

As has been described above, depending upon the conditions under which the process of the invention is carried out, boehmites are obtained. These boehmites consist of single crystals whose dominant morphologies, detected by the Debye-Scherrer patterns, can change from the fibrillar forms to the lamellar forms.

The Debye-Scherrer patterns of the fibrillar boehmites, analyzed by microdensitometry along (002), evidence that the product is a boehmite possessing single crystals developed essentially in a single crystallographic direction, the shape of which can change from long and narrow rods (020) and (125) reflections very weak, (105 reflection of normal intensity) to long and very narrow rods ((hkl) reflections absent, (012) halo and (200) reflection distinct). The direction of elongation of the single crystals is that of the double polymer chains which highly crystalline boehmite is believed to have, and would correspond to the a axis. In this direction, the single crystals have dimensions of between about 200 and 5,000 Å (Warren method and B.E.T. method), and in the other two crystallographic directions, the dimensions are approximately between 10 and 100 Å (estimated from the results of the B.E.T. method).

The electron microdiffraction pattern of the fibrillar boehmites is characteristic of a product which is frequently oriented by joining of the fibrils to form bundles (or fibers).

Dried at 110° C., these fibrillar boehmites have specific surface areas ranging from about 50 to 600 m$^2$/g (measured by the B.E.T. method).

The Debye-Scherrer pattern of the lamellar boehmites evidences numerous reflections characteristic of a tabular habit still possessing the (002) cleavage corresponding to the hydroxyl planes of highly crystalline boehmite in the form of:

(1) rhombic platelets (002) and (105) reflections partially extinct, (008) reflection totally extinct);

(2) rhombic platelets elongated probably along the (110) direction ((020), (105) doublet unresolved), (002) and (008) reflections of normal intensity); and (3) long and broadened rods (002) reflection partially extinct, (008) and (105) reflections totally extinct).

Furthermore, the Warren method applied to these lamellar boehmites evidences that the crystallites have at least two growth dimensions ranging from 50 to 5,000 Å, the thickness of the crystallites, which constitutes the third dimension, generally being smaller and ranging from about 20 to 100 Å.

Dried at 110° C., the lamellar boehmites have specific surface areas ranging from about 50 and 300 m$^2$/g (measured by the B.E.T. method).

Again without wishing to be bound to any particular theory, it may be considered that the shape of the single crystals of the boehmite obtained can be influenced, in particular, by the amount of anions adsorbed onto the various crystal planes and by the treatment temperature.

Thus, in general, it may be considered that, at constant temperature, when the pH of the treatment medium decreases and the ratio of the molar concentration of the anion to that of the alumina increases, the shape of the single crystals of the boehmite obtained changes from the lamellar shapes to the fibrillar shapes described above.

According to the conditions under which the process of the invention is carried out, pseudo-boehmites are also obtained. The degree of crystalline organization, which increases in the order pseudo-boehmite b, pseudo-boehmite a, boehmite, is inversely proportional to the ratio of anion/Al$_2$O$_3$ and directly proportional to the temperature and the time.

The X-ray diffraction, microdiffraction and electron microscopy dadta and also the infra-red spectrography data concerning the pseudo-boehmites obtained according to the invention would appear to indicate that, in the moist state, they are in the form of unstable flakes swollen with water, and that, within these flakes, only very imperfect, pseudo-crystalline microdomains would be developed during the flocculation, these microdomains being highly solvated and connected to one another by intermolecular forces which are such that the swelling of the gel is always limited. The extent, the orientation, the degree of solvation and the crystalline order of these microdomains vary according to the precipitation conditions, thus leading to a variety of products having the same type of loose and imperfect microstructure reminiscent of that of boehmite and distinguished by X-ray diffraction as pseudo-boehmite b or a or recrystallized pseudo-boehmite.

Pseudo-boehmite b denotes the least developed structure. In this case, the pseudo-crystalline microdomains are strongly perturbed by the insertion of impurities still present, and especially, with reference to boehmite, in the c direction, perpendicular to the direction a of elongation of the polymeric molecules (absence of the (002) halo and very low intensity of all the halos present).

Pseudo-boehmite a, or normal pseudo-boehmite, which is purer, has a more advanced state of crystallization of the microdomains than the b form, and shows a very short-range order in the 3 crystallographic reference directions (002) halo fairly intense, located between 6.40 and 6.80 Å and present with the series of halos in the position of the reflections of boehmite).

Recrystallized pseudo-boehmite, which is also called the "product intermediate between boehmite and boehmite gel" (B.C. Lippens, thesis, Delft, 1961), is distinguished from pseudoboehmites b and a by the following characteristics:

(1) (002) interference value ranging from 6.25 and 6.40 Å (corrected values);

(2) considerable thinning of the (002) halo to give a band; and (3) strongly reinforced intensities at the location of the (002) band and of the (012), (014), (103) and (020), (105) halos.

The products obtained by drying the suspensions obtained by the process of the invention have a specific surface area ranging from 50 to 600 m$^2$/g. The drying can be carried out by any means, and in particular in an oven, in a fluidized-bed drier or in an atomizer. In the case of the products consisting of alumina in the form of fibrillar boehmite, the drying can be carried out in a manner well known to those skilled in the art, by carrying out azeotropic distillation after dispersion in an organic medium.

Analysis of the products obtained after drying and calcination at 600° C. makes it possible to detect the existence of transition alumina of the gamma or pseudo-gamma structure, characteristic of the boehmite family.

The products obtained after drying and calcination at a temperature ranging from about 550° to 1,100° C. contain at least one phase selected from the group comprising the gamma, pseudo-gamma, delta and theta phases.

The products obtained after drying and calcination at a temperature above about 1,100° C. contain alpha-alumina.

From the chemical point of view, the boehmites and pseudo-boehmites obtained by the process of the invention have a molar ratio of H$_2$O/Al$_2$O$_3$ ranging from 1 to 2, which corresponds to all pseudo-boehmite structures (molar ratio ranging from about 1.4 to 2) and boehmite structures (molar ratio ranging from 1 to about 1.4).

One of the advantages of the process according to the present invention is that it makes it possible to obtain, in particular, ultra-pure boehmites or pseudo-boehmites in which the proportion of alkali metals does not exceed 0.005%, expressed in the form of the weight ratio of alkali metal oxide/$Al_2O_3$.

Furthermore, said products obtained by the process of the invention exhibit an exceptional homogeneity of structure and of morphology, which originates in particular from the complete conversion of the initial amorphous aluminum hydroxycarbonate to boehmite or pseudo-boehmite.

"Homogeneity of structure" is to be understood as connoting that, in the product obtained, X-ray or electron diffraction analysis only detects the existence of boehmite and/or pseudo-boehmite.

"Homogeneity of morphology" is to be understood as connoting that, in the product obtained, analysis by transmission electron microscopy detects a uniform shape of the crystallites.

These properties can be assessed particularly in the applications which require the use of very pure starting materials, as in the field of catalysis and, in particular, for the manufacture of catalysts for the conversion of hydrocarbons.

The applications of the boehmites and pseudo-boehmites obtained by the process of the invention, if appropriate after drying and if appropriate after calcination, are those normally described for products of the boehmite family. Among such applications, there are mentioned, in particular, applications as fillers, binders, thickeners, dispersing agents, film-forming agents, reinforcing agents, membranes, and base materials for the manufacture of catalyst supports or catalysts and of ceramics.

In order to further illustrate the present invention and the advantages thereof, the following specific examples are given, it being understood that same are intended only as illustrative and in nowise limitative.

EXAMPLE 1

A filtered solution of sodium aluminate, having an equivalent concentration of 81 g/liter of $Al_2O_3$ and 61.2 g/liter of $Na_2O$, was introduced into a glass reactor fitted with a mechanical stirrer, a thermometer and a pH-measuring electrode. Under vigorous stirring, a stream of $CO_2$ gas at atmospheric pressure was passed therethrough such that a slight excess escaped from the reactor. The temperature was allowed to rise to 40° and then fixed at this value by the external circulation of cold water. The stream of $CO_2$ was terminated after 11 minutes, when the pH had dropped to 9.5, and the stirring was continued for 5 minutes. The precipitate was filtered off and washed on the filter with softened water at 30°, until the filtrate obtained had a resistivity of $3.10^5$ ohms. cm. X-ray diffraction detected no crystalline organization on a sample of the filter cake dried in air at 30°. The residue from calcination at 1,000° ($Al_2O_3$) was 51.3%.

In a first step, the washed precipitate of product hydroxycarbonates was mixed, at a temperature of 18°, with an aqueous solution of acetic acid in amounts sufficient to provide, in the mixture, on the one hand a resulting concentration of aluminum compound of 110 g/liter, expressed as $Al_2O_3$, and on the other hand a molar ratio of the concentration of acetate ion to the concentration of aluminum compound, expressed as $Al_2O_3$, of 0.85. To prepare this mixture, the acid solution was gradually poured into the suspension of hydroxycarbonate, under vigorous stirring. The pH of the resulting aqueous medium was 5.0, measured at 20° C.

In a second step, the treatment medium resulting from the first step was heated at a temperature of 85° for a period of 20 minutes, under atmospheric pressure.

In a third step, the treatment medium resulting from the second step was heated at a temperature of 140° for a period of 3 hours, under the autogenous pressure of the reactants.

The above procedure provided a suspension of fine acicular boehmite in which the molar ratio of $H_2O$/$Al_2O_3$ corresponded to 1.5 after drying at 110°. The sodium content, expressed as the weight ratio of $Na_2O$/$Al_2O_3$, was 20 ppm. Examination of this suspension by transmission electron microscopy (FIG. 1) evidenced that the boehmite was entirely in the fibrillar form composed of crystallites, the thickness of which was 25 Å and the other two dimensions of which ranged from 50 to 100 Å. The homogeneity of structure and of morphology of the resultant product was readily apparent.

After calcination of the dried product at 600°, the product alumina was in the $\gamma$-cubic form and its B.E.T. specific surface area was 390 $m^2$/g.

EXAMPLE 2

The washed precipitate of hydroxycarbonate obtained as in Example 1 was mixed, at 20°, with an aqueous solution of nitric acid, $NHO_3$, in sufficient amounts to provide, in the mixture, on the one hand a resulting concentration of aluminum compound of 80 g/liter, expressed as $Al_2O_3$, and on the other hand a molar ratio of the concentration of nitrate ion to the concentration of aluminum compound, expressed as $Al_2O_3$, of 0.20. To prepare this mixture, the acid solution was gradually poured into the suspension of hydroxycarbonate, under vigorous stirring. The pH of the resulting aqueous medium was 4.4.

In a second step, the treatment medium resulting from the first step was heated at a temperature of 70° for a period of 35 minutes, under atmospheric pressure.

In a third step, the treatment medium resulting from the second step was heated at a temperature of 155° for 4 hours, under the autogenous pressure of the reactants.

Figure 2:
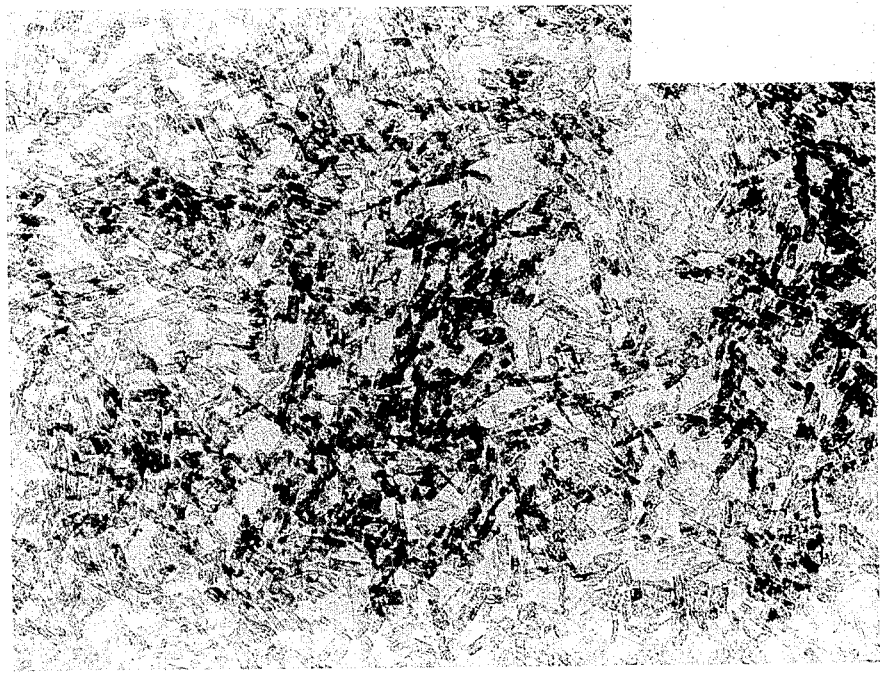
FIG. 2 is an electron photomicrograph of another alumina suspension prepared according to the invention.

The above procedure provided a suspension of lamellar boehmite in which the ratio of $H_2O$/$Al_2O_3$ corresponded to 1.35 after drying at 110°. The sodium content, expressed by the weight ratio of $Na_2O/Al_2O_3$, was 25 ppm. Examination by electron microscopy (FIG. 2) evidenced that the boehmite was entirely in the form of elongate lamellae as well-separated crystallites, the thickness of which was 35 Å and the other two dimensions of which ranged from 80 to 300 Å. The remarkable homogeneity of structure and of morphology of the resultant product was readily apparent.

After calcination of the dried product at 600°, the product alumina was in the $\gamma$-tetragonal form and its B.E.T. specific surface area was 280 $m^2$/g.

EXAMPLE 3

The washed precipitate of hydroxycarbonate obtained as in Example No. 1 was mixed, at 20°, with an aqueous solution of ammonia in sufficient amounts to provide, in the mixture, on the one hand a resulting concentration of aluminum compound of 50 g/liter, expressed as $Al_2O_3$, and on the other hand a molar ratio of the concentration of $NH_4^+$ ion (calculated by assuming complete ionization of the ammonia or of the product resulting from its reaction with the hydroxycarbonate) to the concentration of aluminum compound, expressed as $Al_2O_3$, of 0.20. To prepare this mixture, the ammoniacal solution was gradually poured into the aqueous suspension of hydroxycarbonate, under vigorous stirring. The pH of the aqueous medium thus obtained was 10.2.

In a second step, the treatment medium resulting from the first step was heated at a temperature of 85° for a period of 4 hours, under atmospheric pressure.

In a third step, the treatment medium resulting from the second step was heated at a temperature of 150° for 6 hours, under the autogenous pressure of the reactants.

Figure 3:
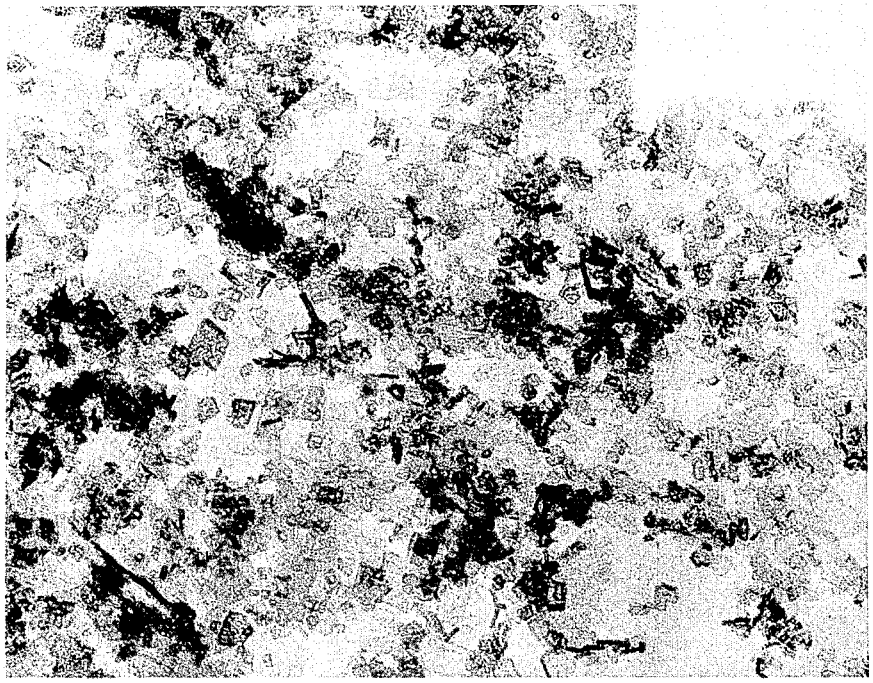
FIG. 3 is an electron photomicrograph of yet another alumina suspension prepared according to the invention.

The above procedure provided a suspension of lamellar boehmite in which the ratio of $H_2O/Al_2O_3$ corresponded to 1.2 after drying at 110°. The sodium content, expressed by the weight ratio of $Na_2O/Al_2O_3$, was 15 ppm. Examination by electron microscopy (FIG. 3) evidenced that the boehmite was entirely in the form of rhombic lamellae as crystallites, the thickness of which was 50 Å and the other two dimensions of which ranged from 200 to 500 Å. The homogeneity of morphology and of structure of the product obtained was readily apparent.

After calcination of the dried product at 600°, the product alumina was in the $\gamma$-tetragonal form and its B.E.T. specific area was 160 m$^2$/g.

EXAMPLE 4

The washed precipitate of hydroxycarbonate obtained as in Example 1 was mixed, at 25°, with an aqueous solution of ammonium acetate in sufficient amount to provide, in the mixture, on the one hand a resulting concentration of aluminum compound of 80 g/liter, expressed as $Al_2O_3$, and on the other hand a molar ratio of the sum of the acetate ions and ammonium ions to the concentration of aluminum compound, expressed as $Al_2O_3$, of 0.15. To prepare this mixture, the salt solution was gradually poured into the solution of hydroxycarbonate, under vigorous stirring. The pH of the resulting aqueous medium was 6.8.

In a second step, the treatment medium resulting from the first step was heated at a temperature of 60° for a period of 3 hours, under atmospheric pressure.

In a third step, the treatment medium resulting from the second step was heated at a temperature of 120° for 2 hours, under the autogenous pressure of the reactants.

Figure 4:
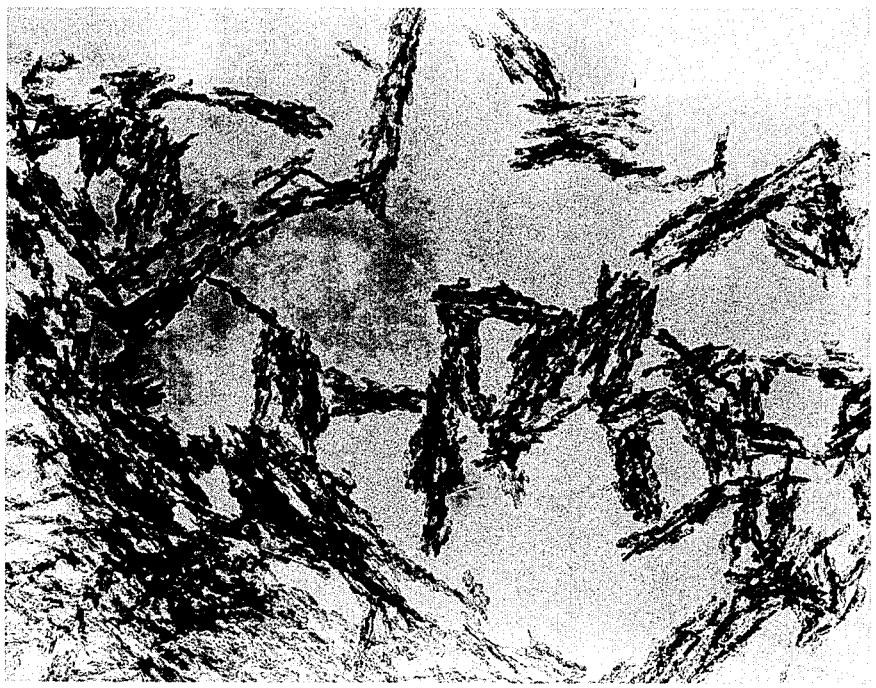
FIG. 4 is a transmission electron photomicrograph of still another alumina suspension prepared according to the invention.

The above procedure provided a suspension of lamellar boehmite in which the ratio of $H_2O/Al_2O_3$ corresponded to 1.3 after drying at 110° C. The sodium content, expressed by the weight ratio of $Na_2O/Al_2O_3$, was 18 ppm. Examination by transmission electron microscopy (FIG. 4) evidenced that the boehmite was entirely in the form of lamellar crystallites, the thickness of which was about 35 Å and the other two dimensions of which were on the order of 100 Å. These crystallites grouped together in elongate clusters. The homogeneity of structure and of morphology of the resultant product was readily apparent.

After calcination of the dried product at 600°, the product alumina was in the $\gamma$-tetragonal form and its B.E.T. specific surface area was 270 m$^2$/g.

EXAMPLE 5

The washed precipitate of hydroxycarbonate obtained as in Example 1 was mixed, at 20°, with an equimolecular aqueous solution of nitric acid and acetic acid in sufficient amounts to provide, in the mixture, on the one hand a resulting concentration of aluminum compound of 60 g/liter, expressed as $Al_2O_3$, and on the other hand a molar ratio of the sum of the nitrate and acetate ions to the concentration of aluminum compound, expressed as $Al_2O_3$, of 0.05. To prepare this mixture, the acid solution was gradually poured into the hydroxycarbonate suspension, under vigorous stirring. The pH of the aqueous medium thus obtained was 6.1.

In a second step, the treatment medium resulting from the first step was heated at a temperature of 50° for a period of 1 hour, under atmospheric pressure.

In a third step, the treatment medium resulting from the second step was heated at a temperature of 110° for 1 hour, under the atuogenous pressure of the reactants.

Figure 5:
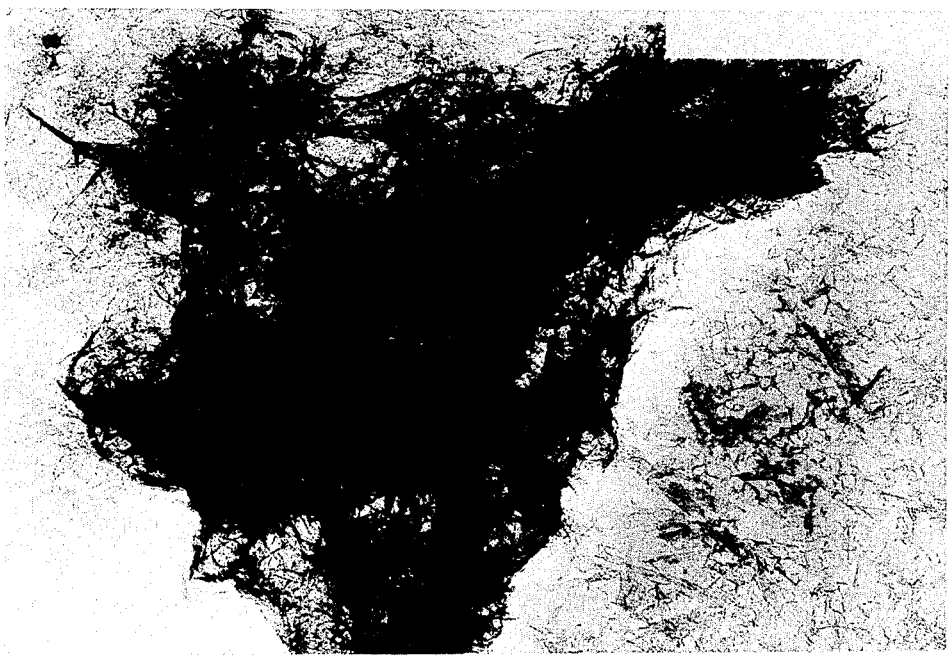
FIG. 5 is a transmission electron photomicrograph of still another alumina suspension according to the invention.

The above procedure provided a suspension of pseudoboehmite in which the ratio of $H_2O/Al_2O_3$ corresponded to 1.85 after drying at 110°. The sodium content, expressed by the weight ratio of $Na_2O/Al_2O_3$, was 30 ppm. Examination by transmission electron microscopy (FIG. 5) evidenced that the pseudo-boehmite was a developed pseudo-boehmite of the a type, the membranous appearance of which was characteristic. The homogeneity of structure and of morphology of the resultant product was readily apparent.

After calcination of the dried product at 600°, the product alumina was in the pseudo-$\gamma$ form and its B.E.T. specific surface area was 140 m$^2$/g.

EXAMPLE 6

The washed precipitate obtained as in Example 1 was mixed, at 20°, with water and an aqueous solution of acid, base or salt, such as to produce the conditions of the 3-step treatment described in Table I.

The characteristics of the resulting products are also reported in Table I. The sodium content, expressed as $Na_2O$ per 100 g of $Al_2O_3$, was less than 30 ppm in all cases.

TABLE I

| | CONDITIONS OF TREATMENT | | | | | | | |
|---|---|---|---|---|---|---|---|---|
| | 1st step | | | | 2nd step | | 3rd step | |
| Treatment reagent | Conc. of $Al_2O_3$ (g/l) | $\dfrac{\text{Conc. of reagent}}{\text{Conc. of } Al_2O_3}$ mols | | Resulting pH (20°) | Temperature (°C.) | Time (hours) | Temperature (°C.) | Time (hours) |
| $HNO_3$ | 130 | 0.7 | | 3.1 | 85 | 0.5 | 160 | 3 |
| HCl | 90 | 0.8 | | 3.1 | 85 | 0.5 | 160 | 3 |
| $HNO_3$ | 130 | 0.4 | | 4.6 | 70 | 2 | 160 | 3 |
| $NH_4NO_3$ | 80 | 0.2 | | 6.2 | 70 | 2 | 120 | 2 |
| $NH_4OH$ | 80 | 0.6 | | 10.4 | 85 | 4 | 160 | 4 |

CHARACTERISTICS OF THE PRODUCTS OBTAINED

Transmission electron microscopy

Specific surface area after calcina-

TABLE I-continued

| Treatment reagent | Crystallization Morphology state | Dimensions in Å Width | Length | Thickness | $\frac{H_2O}{Al_2O_3}$ (mols) | tion at 600° $(m^2/g)$ |
|---|---|---|---|---|---|---|
| $HNO_3$ | needles | 100–150 | 1,000–3,000 | 30 | 1.45 | 360 |
| HCl | needles | 100–200 | 500–2,000 | 30 | 1.4 | 390 |
| $HNO_3$ | rods | 200–300 | 500–1,000 | 40 | 1.3 | 250 |
| $NH_4NO_3$ | grouped lamellae | 100–150 | 150–200 | 25 | 1.35 | 270 |
| $NH_4OH$ | distinct lamellae | 300–700 | 300–700 | 50 | 1.15 | 130 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of ultrapure and homogeneous boehmite and pseudo-boehmite, comprising (i) admixing amorphous aluminum hydroxycarbonate which has been prepared by carbonating an alkali metal aluminate with carbon dioxide and then filtering and washing the precipitate which results, with a solution of an acid, a base, a salt, or mixture thereof, with the pH of the reaction medium which results being maintained at a value of less than 11, (ii) next heating such reaction medium at a temperature of less than 90° C. for a period of at least 5 minutes, and (iii) thence heating the reacting medium resulting from the step (ii) at a temperature ranging from 90° C. to 250° C.

2. The process as defined by claim 1, said solution in said step (i) being poured onto the hydroxycarbonate.

3. The process as defined by claim 2, the step (ii) being carried out a temperature of from 50° C. to 85° C. for from 5 minutes to 5 hours.

4. The process as defined by claim 3, the step (iii) being carried out for from 10 minutes to 30 hours.

5. The process as defined by claim 4, the step (iii) being carried out at a temperature of from 100° C. to 160° C. for from 30 minutes to 10 hours.

6. The process as defined by claim 1, said carbonation being carried out at a temperature ranging from 0° C. to 60° C. for less than 30 minutes and the pH of the carbonation reaction medium ranging from 7 to 11.5.

7. The process as defined by claim 6, the pH of the carbonation reaction medium ranging from 9 to 11.

8. The process as defined by claim 6, comprising carbonating a solution of an alkali metal aluminate, the concentration of which ranging from 20 to 200 g/liter, expressed as alumina, $Al_2O_3$, and the partial pressure of the carbon dioxide ranging from 0.3 to 10 bars.

9. The process as defined by claim 8, the precipitate of amorphous aluminum hydroxycarbonate being washed with water until the wash waters have a resistivity in excess of $10^5$ Ω.cm, measured at 20° C.

10. The process as defined by claim 8, in the step (i) the washed precipitate being admixed with a solution comprising a water soluble, strong or weak mineral or organic acid.

11. The process as defined by claim 10, said acid comprising nitric acid, perchloric acid, sulfuric acid, hydrochloric acid, hydriodic acid, hydrobromic acid, formic acid, acetic acid, propanoic acid, butanoic acid, oxalic acid, maleic acid, succinic acid, glutaric acid, chloroacetic acid, bromoacetic acid, and mixtures thereof.

12. The process as defined by claim 8, in the step (i) the washed precipitate being admixed with a solution comprising a water soluble weak base.

13. The process as defined by claim 12, said weak base comprising ammonia, an amine, an aminoalcohol, a quaternary ammonium hydroxide, a compound which in situ decomposes into a weak base, and mixtures thereof.

14. The process as defined by claim 8, in the step (i) the washed precipitate being admixed with a solution comprising a water soluble salt.

15. The process as defined by claim 14, said salt comprising an ammonium or amine salt, an aluminum nitrate, chloride, formate, citrate, acetate or oxalate, or mixture thereof.

16. The process as defined by claim 8, the concentration of aluminum compound in the mixture of step (i) ranging from 20 to 400 g/liter, expressed as $Al_2O_3$.

17. The process as defined by claim 16, said concentration ranging from 40 to 200 g/liter.

18. The process as defined by claim 16, the molar ratio of the sum of the anions and cations in the mixture of step (i), other than $H^+$ and $OH^-$, to the equivalent of the aluminum compound, expressed as $Al_2O_3$, ranging from 0.01 to 2.

19. The process as defined by claim 18, said molar ratio ranging from 0.03 to 0.9.

20. A process for the preparation of ultrapure and homogeneous boehmite and pseudo-boehmite, comprising (i) admixing amorphous aluminum hydroxycarbonate with a solution of an acid, a base, a salt, or mixture thereof, with the pH of the reaction medium which results being maintained at a value of less than 11, wherein the amorphous aluminum hydroxycarbonate is prepared by carbonating an alkali metal aluminate with carbon dioxide at a temperature ranging from 0° C. to 60° C. for less than 30 minutes and with the pH of the carbonation reaction medium ranging from 7 to 11.5, and thence filtering and washing the precipitate which results with water until the wash waters have a resistivity in excess of $10^5$Ω. cm, measured at 20° C., and wherein the molar ratio of the sum of the anions and cations in the mixture, other than $H^+$ and $OH^-$, to the equivalent of the aluminum compound, expressed as $Al_2O_3$, ranges from 0.01 to 2, (ii) next heating the resulting reaction medium at a temperature of less than 90° C. for a period of at least 5 minutes, and (iii) thence heating the reaction medium resulting from the step (ii) at a temperature ranging from 90° C. to 250° C.

* * * * *